March 21, 1944.  E. H. SHAFF  2,344,740

HOSE COUPLING DEVICE

Filed Aug. 1, 1942

Inventor
Ernest H. Shaff
BY
Parker, Carlson, Pitzner & Hubbard
Attorneys.

Patented Mar. 21, 1944

2,344,740

UNITED STATES PATENT OFFICE 2,344,740

HOSE COUPLING DEVICE

Ernest H. Shaff, Grand Haven, Mich., assignor to Keller Tool Company, Grand Haven, Mich., a corporation of Michigan Application August 1, 1942, Serial No. 453,166

4 Claims. (Cl. 285—169)

The invention relates to hose coupling devices and the general aim of the invention is to provide a coupling which is adapted to be quickly connected or disconnected yet will securely lock the hose sections together.

Another object is to provide a new and improved coupling device of this nature embodying a nipple and a coupling structure arranged to be interconnected in fluid tight relation and having novel locking means retractable for assembly of the nipple and coupling structure and having a locking engagement with the nipple released only by intentional manipulation of a member which exerts a pull on the locking means and rocks or swings it out of engagement with the nipple.

Other objects and advantages will become apparent in the following description and from the accompanying drawing, in which.

Figure 2:
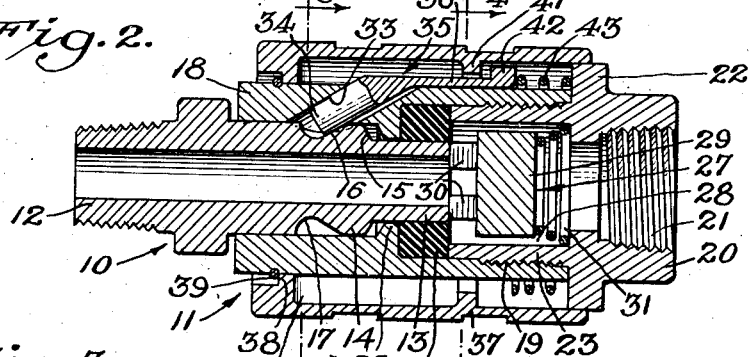
Fig. 2 is a similar view but showing the assembly completed.
Figure 3:
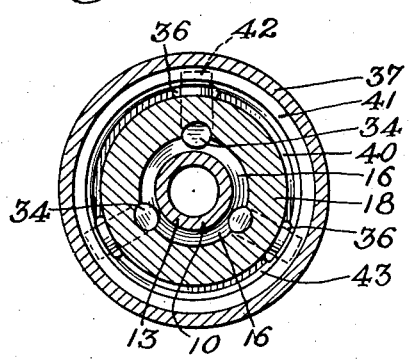
Figure 4:
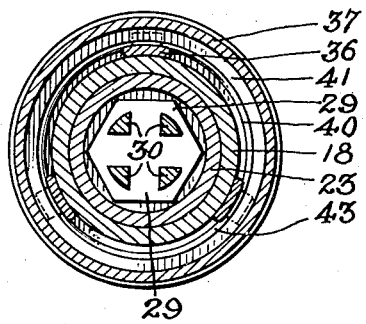

Figs. 3 and 4 are transverse sectional views taken respectively along the lines 3—3 and 4—4 of Fig. 2.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the exemplary embodiment of the invention shown in the drawing, the numerals 10 and 11 respectively designate the nipple and the coupling structure generally. The nipple is a tubular member having one end 12 fashioned for connection with a hose section. Its other end has a terminal portion 13 of somewhat reduced diameter ending at an annular rib 14 having an arcuate or angular surface 15 facing generally in the direction of the portion 13 and an angularly outwardly and oppositely directed surface 16. The angular surface 16 defines one side of an annular groove 17.

The coupling structure includes means for locking engagement with the groove 17 on the nipple arranged to be quickly retracted to permit of instant assembly and disassembly. The structure has a tubular housing 18 internally screw threaded at one end, as at 19, for engagement with external threads on an end of a hose coupler 20. The coupler, as shown, is a tubular member having a tapering screw threaded socket 21 for receiving a hose nipple, an external annular flange 22 about midway of its length and a smooth end portion 23 snugly fitting within the housing 18 inwardly of the screw threads 19. The axial face of this end 23 bears against a flexible and resilient sealing gasket 24 of rubber, neoprene or the like, and seats it against a shoulder provided by an internal annular rib 25 on the housing 18. The rib is dimensioned to have a relatively snug sliding fit with the restricted end 13 of the nipple to hold it against radial movement in assembly and to guide its entrance movement through the gasket. Preferably the outer face of the rib is somewhat angular, as at 26, to guide the nipple into the opening through the rib.

A valve 27, located in the chamber 28 defined by the inner end of the hose coupler 20, comprises, in this instance, a head 29 arranged to seat against the inner face of the gasket 24 and having spaced axially directed projections 30 (Fig. 4) thereon extending into the opening through the gasket. The valve may be normally closed by a coil spring 31 bearing between the valve head and an internal shoulder 32 on the hose coupler. Engagement of the projections by the end of the nipple unseats the valve and allows fluid or gas to flow between the projections into the nipple. If desired, the head may be of such a circumferential form as hexagonal to provide clearance between the head and the walls opposed thereto. Moreover, by properly dimensioning the head the angular corners thereof may have sliding engagement with the opposing walls to guide the valve accurately in its movements. In such a structure the valve-seating spring may be omitted inasmuch as the gas or fluid pressure on the head will seat it.

Means for locking the inserted nipple in the coupling structure is provided which is retractable manually or by the insertion of the nipple into the housing to permit the nipple to pass to its coupled position and which may be retracted only by manipulation to release the nipple. At circumferentially spaced intervals the housing 18 has angularly transverse bores 33 therein which open toward the nipple receiving end of the housing. The angularity of the bores and that of the rib surfaces 16 on the nipple to the axis of the device are substantially the same. Each bore is arranged to receive a cylindrical section 34 of a locking key 35 having a flat outer section 36 related to the cylindrical section at substantially the angularity of the surface 16 and bores 33. Each bore has a diameter larger than the cylindrical section so that the section has lateral play for a purpose to be described. The keys are so dimensioned that when the outer sections are flat against the housing the cylindrical sections will extend slightly into the bore in the housing (see Fig. 2).

A manipulating sleeve 37, which may be externally knurled, is slidably mounted on the housing 18, its movements being guided at one end by the flange 22 on the hose coupling and at the opposite end by an internal flange 38 on the sleeve encircling the housing. Sleeve movement limiting means such as a split ring 39 on the housing for engagement by the flange 38 may be provided. Internally the sleeve is larger than the housing forming an annular recess 40 through which the outer sections 36 of the keys 35 extend. An internal rib 41 on the sleeve extends into the recess to engage heads 42 on the ends of the outer key sections 36 in the movement of the sleeve away from the limiting means 39. A coil spring 43 bears between the key heads 42 and the hose coupling flange 22.

Figure 1:
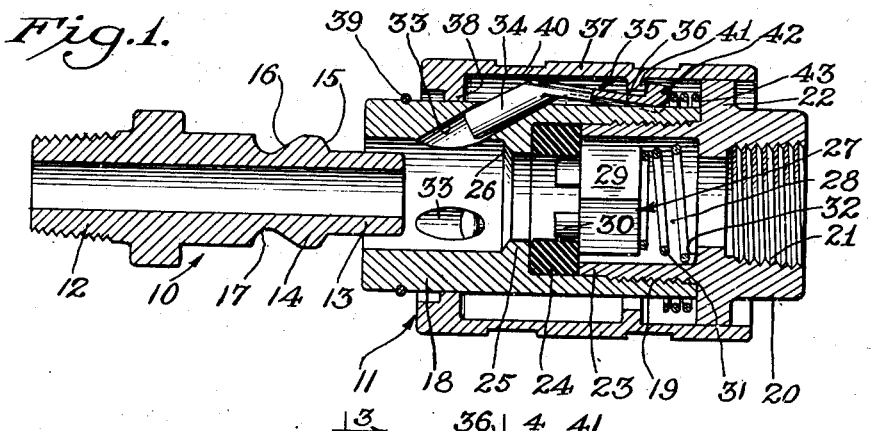
Figure 1 is a view in axial section through a coupling device embodying the features of the invention showing the relationship of the parts just prior to assembly.

By this arrangement, the sleeve as it slides away from its limit will, by the engagement of the flange 41 with the key heads 42, shift the keys against the force of the spring 43 and draw the cylindrical sections 34 outwardly in the bores 33 and clear of the housing bore (see Fig. 1). The angularity of the key sections permits the cylindrical sections to slide outwardly with the keys as a whole pivoting about the heads 42. The lateral clearance or play between the bores and the key sections 34 permits the sections to tilt or rock as they are so withdrawn. Upon release of the sleeve the spring 43 will return the keys and through them the sleeve to their initial positions. The keys, it will be noted, are movable independently of the sleeve.

In operation the nipple may be inserted into the housing either while the keys are extended into the housing bore, as shown in Fig. 2, or after they have been manually retracted, as shown in Fig. 1, by movement of the sleeve. The former will be the more usual operation, during which the arcuate shoulder 15 on the nipple rib 14 will engage the projecting key ends and move them outwardly of the housing until the rib can pass them. Thereupon the spring 43 projects the keys into the nipple groove 17. The angular relationship of the keys 35, bores 33 and rib surface 16 prevents a return movement inasmuch as an outward movement of the nipple will shift the keys in the same direction and jam them against the side walls of their bores (see Fig. 2). The keys therefore positively lock the nipple in the coupling structure until the keys are retracted to release the nipple by intentional manipulation of the sleeve. In its coupled position the inner end of the nipple will have lifted the valve from its seat to open the line through the coupling, the gasket 24 serving in this relationship to prevent leakage around the nipple.

It will be evident from the foregoing that a new and improved structure has been provided which permits a coupling of hose sections to be made quickly and securely and just as quickly to be disconnected.

I claim as my invention:

1. In a coupling device of the character described the combination of a housing having a bore therethrough, a nipple adapted for insertion into the bore, means for insuring a seal between the nipple and housing when the nipple is so inserted, said housing having a plurality of circumferentially spaced bores therein sloping inwardly toward the nipple receiving end thereof, a plurality of rigid keys slidable in said bores and having angular ends arranged to abut the outer surface of the housing when the keys are fully inserted into the bores, said keys when so inserted having their ends extending angularly into the housing bore, spring means bearing against said angular ends for urging said keys into such inserted position, a manipulating sleeve encircling said housing and having an internal recess into which said angular ends extend, interengageable means on said angular ends and said sleeve for moving said keys longitudinally of said housing against the force of said spring means to retract said keys when said sleeve is moved in one direction, said bores in which the keys move being dimensioned to provide for a lateral swinging movement of the keys outwardly from the axis of the coupling as the sleeve is operated to retract the keys, said nipple having a groove therein for engagement by the extended ends of said keys, and a rib on said nipple adjoining said groove and adapted to enter said housing bore, said rib having an arcuate surface adapted to engage said ends of said keys and move them out of said housing bore during insertion of the nipple and having an angular surface forming part of said groove for complementary engagement with said key ends.

2. In a coupling device of the character described the combination of a housing having a bore therein to receive a nipple, said housing having a plurality of circumferentially spaced bores therein sloping inwardly toward the nipple receiving end thereof, a plurality of inflexible members slidable and swingable in said bores and having outer angular ends, said members having an inner position in which their ends extend angularly into the housing bore, spring means urging said members toward said inner position, and manipulating means on said housing engageable with the outer ends of said members for sliding the members within the bores and for swinging them about said outer ends to retract said members in their bores, said members fitting loosely in said bores and being laterally movable relative thereto for swinging movement during retraction and for shifting movement into engagement with the sides of said bores when the force of said spring is exerted thereon.

3. In a coupling device of the character described, the combination of a housing having a bore therein to receive a nipple, said housing having a bore therein angularly related to the axis of the housing bore, an inflexible member slidable and laterally movable in the angular bore from an operative position projecting into the housing bore to a retracted position clear of said housing bore, said member having an angular section outside the housing, means urging said member toward said operative position, and manipulating means engaging said angular section for imparting a sliding and rocking movement to said member about the end of said angular section as a center to retract said member, said angular bore being of larger cross sectional dimensions than said member to permit said member to tilt therein, said member in its projected position being adapted for holding engagement with an interfitting part of the coupling device.

4. In a coupling device of the character described, the combination of a tubular housing arranged to receive a nipple therein, said housing having a bore therein angularly related to the axis of the housing, a rigid locking member loosely disposed in said bore, said locking member being movable from an operative position in which an end thereof extends into the interior of said housing to a retracted position by combined longitudinal sliding and lateral rocking movement, means urging said locking member into said operative position thereof, and means for imparting a combined rocking and longitudinal movement to said locking member to shift it to said retracted position.

ERNEST H. SHAFF.